United States Patent [19]

Takenaka

[11] E Re. 30,942

[45] Reissued May 25, 1982

[54] PRINTING APPARATUS EMPLOYING BIDIRECTIONAL STEPPING MOTORS TO POSITION TYPE MEMBER

[75] Inventor: George Takenaka, Santa Ana, Calif.

[73] Assignee: Tracor, Inc., Austin, Tex.

[21] Appl. No.: 32,125

[22] Filed: Apr. 23, 1979

Related U.S. Patent Documents

Reissue of:

[64] Patent No.: 3,374,873
Issued: Mar. 26, 1968
Appl. No.: 345,342
Filed: Feb. 17, 1964

[51] Int. Cl.[3] ..... B41J 1/50; B41J 9/04

[52] U.S. Cl. ..... 400/154.2; 400/154.5

[58] Field of Search ..... 400/154.2, 154.5, 163, 400/903; 178/28, 34; 101/93.19, 93.22; 340/317-319; 318/138, 685, 696

[56] References Cited

U.S. PATENT DOCUMENTS

| | | | |
|---|---|---|---|
| 2,617,870 | 11/1952 | Kern | 340/373 X |
| 2,727,944 | 12/1955 | Howard | 400/154.2 X |
| 2,750,548 | 6/1956 | Van Dalen | 318/696 |
| 2,757,775 | 8/1956 | Hickerson | 400/154.2 |
| 2,769,029 | 10/1956 | Howard | 400/154.2 X |
| 2,823,345 | 2/1958 | Ragland et al. | 318/602 |
| 2,847,505 | 8/1958 | Kratt et al. | 178/34 |
| 2,864,044 | 12/1958 | Pardee | 318/664 |
| 2,884,581 | 4/1959 | Schunemann et al. | 318/612 |
| 2,927,676 | 3/1960 | Abbondanza | 400/134.2 |
| 2,945,091 | 7/1960 | Canepa | 178/34 |
| 2,989,680 | 6/1961 | Weiser et al. | 318/601 |
| 3,024,399 | 3/1962 | Valentino | 318/283 |
| 3,042,174 | 7/1962 | Howard | 400/154.2 X |
| 3,042,819 | 7/1962 | Kennedy | 318/696 X |
| 3,063,540 | 11/1962 | Howard | 400/154.2 |
| 3,103,651 | 9/1963 | Heinecke et al. | 340/203 |
| 3,109,167 | 10/1963 | MacIntyre et al. | 340/319 |
| 3,117,268 | 1/1964 | Madsen | 318/283 |
| 3,127,587 | 3/1964 | Rasmussen et al. | 340/146.2 |
| 3,132,558 | 5/1964 | Wymann | 318/696 X |
| 3,142,054 | 7/1964 | Burri | 340/318 |
| 3,206,665 | 9/1965 | Burlingham | 318/312 |
| 3,218,625 | 11/1965 | Knotowicz | 340/319 |
| 3,227,258 | 1/1966 | Pannier et al. | 400/131 |
| 3,239,738 | 3/1966 | Welch | 318/696 |
| 3,241,017 | 3/1966 | Madsen et al. | 318/138 |
| 3,256,969 | 6/1966 | Bretti | 400/154.2 X |
| 3,267,456 | 8/1966 | Morris et al. | 340/317 |
| 3,282,389 | 11/1966 | Rudisch et al. | 400/130 |
| 3,294,211 | 12/1966 | Mason | 400/154.3 |
| 3,304,858 | 2/1967 | Reach et al. | 101/93.19 |
| 3,307,676 | 3/1967 | Hickerson | 400/155 |
| 3,327,191 | 6/1967 | Goto | 318/696 |
| 3,466,517 | 9/1969 | Leenhouts | 318/603 |

*Primary Examiner*—Paul T. Sewell

[57] ABSTRACT

A printer is disclosed that utilizes a single font of somewhat cylindrical configuration, bearing type for various symbols upon its peripheral surface. The font is movably mounted to accommodate rotation and axial displacement, to set a desired symbol in printing position. The type font is controlled in movement by shift registers operating in combination with a source of pulses bi-directional stepping motors and reset apparatus. The printer is responsive to various codes which are registered by components in the shift registers which are then cleared by pulses that step the stepping motors to position the type font by driving the stepping motors in a forward direction to accomplish the desired position in components. Thereafter, the type font is actuated to print the desired symbol. Structure is disclosed for returning the type font to a home position by reverse stepping the stepping motors.

8 Claims, 3 Drawing Figures

128
SYNC
b5 b4 b3 b2 b1
126
PULSE SHAPER CIRCUITS
131
130
132
144
SPACE
MACHINE-FUNCTION DECODING MATRIX
LTRS
148
146
CARRIAGE RETURN
FIGS
150
152
180
134
136
137
138
168
135
154
170
172
174
162
164
166
182
176
STEPPING REGISTER Ø
STEPPING REGISTER X
178
196
192
188
186
PULSE GENER' OR
ZERO DETECTOR CIRCUIT
ZERO DETECTOR CIRCUIT
194
184
70
200
72
190
204
106
STEP M
STEP M
STEP M
F R
240
232
234
202
206
250
DELAY CIRCUIT
210
PRINT SOLENOID
90
252
236
238
208
216
80
241
DELAY CIRCUIT
RIBBON SOLENOID
219
224
230
PULSE GENERATOR
222
226
245
225
228
116
ROLLER STEP SOLENOID
247

PRINTING APPARATUS EMPLOYING BIDIRECTIONAL STEPPING MOTORS TO POSITION TYPE MEMBER

Matter enclosed in heavy brackets [ ] appears in the original patent but forms no part of this reissue specification; matter printed in italics indicates the additions made by reissue.

The present invention relates to a printing apparatus, which for example may be embodied in a telegraphic printer for sequentially printing symbols in accordance with applied electrical signals.

Signal-controlled printers are widely employed in various applications to transcribe messages carried in the form of telegraphic code signals. In addition to the widespread use of such printers in stationary installations, there exists a considerable need for them in mobile installations. For example, automobile and aircraft installations are often desirable for a telegraphic printer to provide an accurate readily-perceivable message. However, in the past, considerable difficulty has been experienced in mobile installations of printers, both as a result of their size and their mechanical complexity. That is, prior printers have generally required a considerable space and have added considerable weight to the carrying vehicle. Furthermore, such prior printers have conventionally required complex mechanical positioning elements, to selectively drive printing fonts. Therefore, during mobile use, even slight acceleration forces may cause these prior printers as described, to malfunction resulting in an error in the transcribed message. As a result, these mechanisms have often been shock-mounted to reduce difficulties resulting from acceleration and shock forces; however, at best any improvement in reliability has been accompanied by increased weight and space requirements. Therefore, a need exists for an improved printer, which may be embodied in a unit of relatively small size, and lightweight, and which may be economically manufactured for use in mobile installations having reliable operation.

In general, the present invention comprises a type element or font which may take a generally-cylindrical configuration and which bears type for various symbols upon its peripheral surface, and is mounted so that it may be variously displaced to present different symbols in a printing position. The system further includes means for providing electrical pulses in sequences, indicative of the desired displacement for the type element or font to accomplish a predetermined symbol. Stepping motors, i.e. motors which accomplish a predetermined rotational displacement upon receiving an electrical pulse, are then provided to receive the sequence of pulses and are connected to position the type font accordingly. The system further includes apparatus for activating the type font to accomplish a printed symbol after the desired symbol has been properly positioned.

An object of the present invention is to provide an improved printer which may be embodied in a compact rugged form.

Another object of the present invention is to provide an improved telegraphic printer with simplified mechanical controls.

Still another object of the present invention is to provide an improved printing mechanism, which may be economically constructed, in a form sufficiently rugged for practical mobile use.

A further object of the present invention is to provide an improved telegraphic printer which employs digital stepping motors to position a type font in accordance with electrical command signals.

Still a further object of the present invention is to provide a system wherein electrical code signals indicative of symbols are decoded into a sequence of pulses, numerically indicative of the symbol, and further including a digital stepping motor to receive said pulses and thereby position a type font to print a selected symbol.

These and other objects and advantages of the present invention will become apparent from a consideration of the following taken in conjunction with the appended drawings, wherein.

Figures 1, 2:
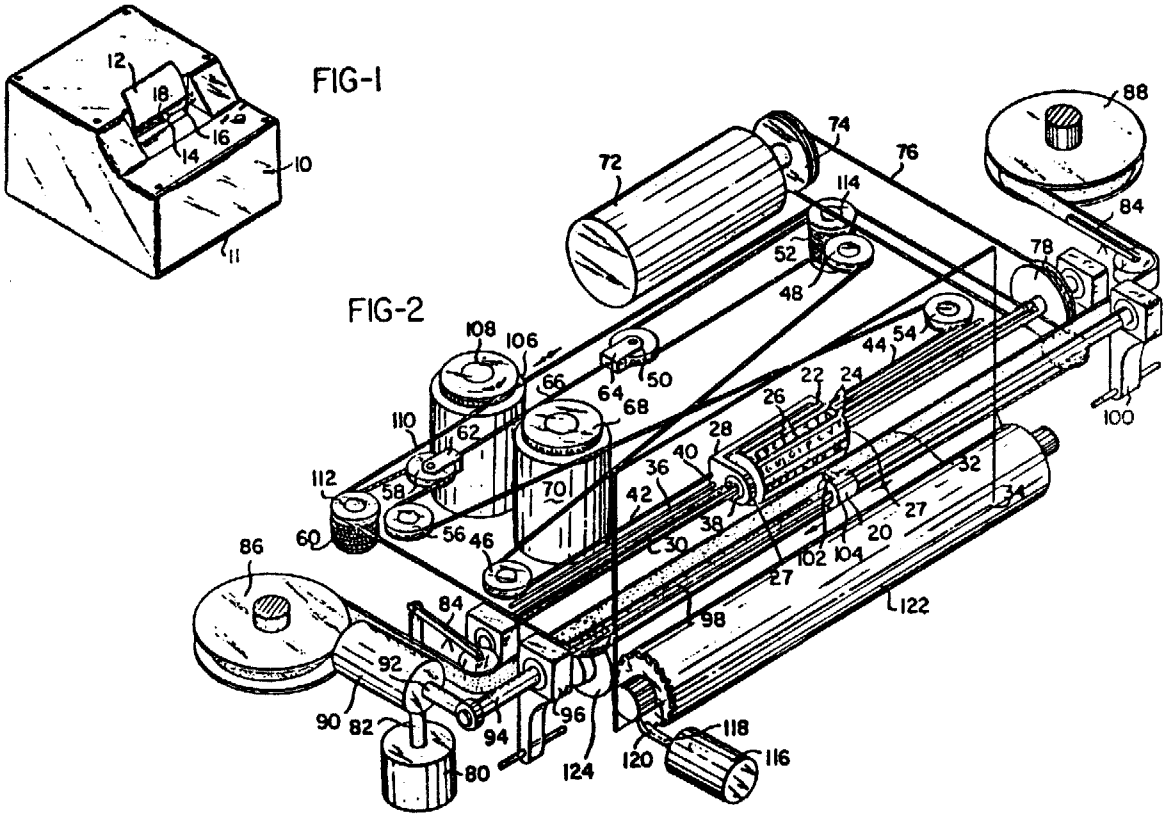
FIG. 1 is a perspective view of a telegraphic printer incorporating the principles of the present invention.
FIG. 2 is a perspective and diagrammatic view of the mechanical system employed in the printer of FIG. 1.

Referring initially to FIG. 1, there is shown a compact printer 10 in a relatively-small housing 11, incorporating the principles of the present invention, to accomplish a printed message on paper 12. The printer 10 receives electrical signals, as by radio or direct line for example, which signals are representative of various symbols carried on a type font (not shown in FIG. 1).

The type font in the machine operates in cooperation with a hammer 14 which is carried on a shaft 16 in front of a printing ribbon 18. The hammer 14 and the type font (not shown) are positioned in accordance with the received electrical signals, so that the hammer 14 lies over the section of the paper 12 upon which the next symbol is to be printed, while the commanded symbol lies immediately under the hammer, behind the paper. When the positioning operation is complete, the hammer 14 is driven against the ribbon 18 which engages the paper 12 that is backed by the type or print lines of the desired symbol which is thus printed. In general, an important feature of the present invention resides in the manner in which the type font, along with the other mechanical elements in the printer, are positioned, by the use of digital stepping motor apparatus.

Referring now to FIG. 2 for a more detailed consideration of the printer, a type hammer 20 is shown, which operates in conjunction with a type cylinder or foot 22. The font 22 as shown in FIG. 2, has eight rows 24 of type symbols 26 spaced about its periphery and each of the rows 24 contain eight symbol positions. Therefore, to provide a desired symbol under the hammer 20, the font 22 may have to be displaced rotationally about its axis (to locate a proper row 24), and along its axis (to locate a particular symbol 26).

The font 22 may be variously constructed, as for example, of lightweight plastic material to which a metallic surface containing type symbols is applied. Such a structure preserves the weight of the font low with resultant low inertia. Of course, various other embodiments for the type cylinder or font 22 are practical in accordance with the knowledge of the prior art.

The type cylinder or font 22 is mounted between the arms 27 of a frame 28, that is fixed against rotation and carried on a splined shaft 30 along with the font. To provide a desired character on the font 22 in printing position under the hammer 20, the frame 28 is placed to the proper position along the shaft 30, then the shaft 30 revolves the font 22 to select the desired letter. Thereafter, a print ribbon 32 raises to a position between the font 22 and the hammer 20, after which the hammer 20 strikes the ribbon 32 against a printing medium or paper 34 (shown in phantom).

After the symbol is printed, the ribbon 32 drops back into position to reveal the print while the hammer 20 and the type font 22 advance to the next character location on the paper 34.

The frame 28 slides on a guide shaft 36 which holds the frame against rotational displacement as the shaft 30 revolves. The frame 28 is generally of U-shaped configuration, with the shaft 30 extending through bearings 38 contained in arms 27, and through the type font 22, engaging the latter. One end 40 of an inelastic cable 42 is connected at one side of the frame 28 while an end of a similar cable 44 is connected at the other side. These cables are driven to travel the frame 28 along with the font 22 across the width of the paper 34. The cable 42 passes over a rotatively-mounted stationary pulley 46, reverses direction, and passes over a similar pulley 48 to again reverse direction and pass over a single movable rotatively-mounted pulley 50, then is taken up on a rotatively-mounted stationary drum 52. The cable 44 in a somewhat similar manner passes from the frame 28 over a stationary rotatively-mounted pulley 54, then over a similar pulley 56, and over a movable rotatively-mounted pulley 58 to be taken up on a rotatively-mounted drum 60.

The pulleys 58 and 50 are mounted respectively in blocks 62 and 64 which are connected by a cable 66 that passes around a drive capstan 68 of a stepping motor 70. The stepping motor 70 may, for example, take the form of various models manufactured by Pace Controls Corporation of Needham Heights, Mass., which motors provide a predetermined angular displacement of a rotative shaft upon receipt of a digital pulse. Of course, various other forms of stepping motors have also proved satisfactory in the system.

The stepping motor 70 acts through the cable 66, the pulleys 50 and 58, and the cables 42 and 44, to place the type font 22 in any of eight positions, each of which provides one symbol location under the hammer 20. A stepping motor 72 similar to the motor 70 drives a capstan 74 carrying an endless cable 76 which passes over a drive wheel 78 mounted on the splined shaft 30. Thus, the stepping motor 72 revolves the shaft 30 through the cable 76, to in turn revolve the font 22 and position any of eight rows 24 of symbols 26 under the hammer 20.

After the motors 70 and 72 have operated to position the desired symbol space under the hammer 20, the symbol is printed and the font is returned to home position. Somewhat simultaneously the hammer 20 and the font 22 are moved to the next area on the paper.

The printing operation is accomplished in several steps, the first being energization of a solenoid coil 80 acting through an armature 82 and a pivotally-mounted lift linkage 84, to raise the ribbon 32 to a position between the hammer 20 and the type font 22. The ribbon 32 is carried on spools 86 and 88 as well known in the prior art and may include an automatic mechanism, also as well known in the prior art to variously advance the ribbon from one spool to the other providing even wear over the ribbon 32.

With the ribbon 32 in a raised position, a printing or typing solenoid coil 90 is energized acting through an armature 92 and a shaft extension 94 to drive the hammer 20 against the ribbon 32. The extension 92 is journaled through a pivotally-mounted support block 96, to pass through the splined shaft 98 carrying the hammer 20, then into a pivotally-mounted support block 100. The hammer 20 includes a head 102 which provides the actual striking surface, and which is integrally formed with an annulus 104 in which the splined shaft 98 is matingly received.

After a printing operation has been completed, the solenoid coils 80 and 90 are deenergized permitting the hammer 20 and the ribbon 32 to fall back into their quiescent positions. Somewhat simultaneously, the hammer 20 and the type font 22 are advanced one step to the right so that the hammer 20 dwells over the next area to receive a symbol. The hammer and type font are moved stepwise to the right by a stepping motor 106 which may be similar to the stepping motors previously described, and which carries a capstan 108 that drives a looped cable 110, the ends of which are affixed to the hammer 20. In passing to the hammer 20 from the capstan 108, the cable 110 passes about corner pulleys 112 and 114 which are axially mounted on drums 60 and 52 respectively. The drums 60 and 52 receive the end of the cables 42 and 44 respectively which are affixed thereto. Therefore, on rotation of the pulleys 112 and 114, to accommodate the movement of the cable 110 to drive the hammer 20, the drums 52 and 60 are also revolved shifting the position of the pulleys 50 and 58 to advance the position of the font 22. That is, at the conclusion of each printing operation to establish a symbol or space on the paper 34, the stepping motor 106 is pulsed to revolve the capstan 108 in a clockwise direction thereby pulling the hammer 20 one step to the right through the cable 110, and moving the type font 22 one step to the right through the pulleys 58 and 50 and the cables 42 and 44. After the stepping motion, the printer is ready for another symbol to be printed.

At the completion of a line of type on the paper 34, the hammer 20 and the type font 22 are returned to the left preparatory to printing another sequence of symbols. This operation is accomplished by the stepping motor 106 moving in a reverse direction under control of electrical impulses as described below. In addition to returning the hammer 20 and the type font 22 to the left position, the paper 34 must be raised one line. The paper 34 is raised by a solenoid coil 116, the armature 118 of which engages a ratchet 120 affixed to a drive roller 122 which mates with a backup roller 124. Thus as the solenoid coil 116 is energized, the ratchet 120 is stepped revolving the roller 122 in a clockwise direction raising the paper 34 to the next line to receive another roll of print. Of course, various other well-known techniques may also be employed in this regard.

The stepping motors considered in FIG. 2 along with the solenoid coils are controlled by electrical signals which are derived from applied code pulses. The manner in which these signals are derived will now be considered with reference to FIG. 3.

Figure 3:
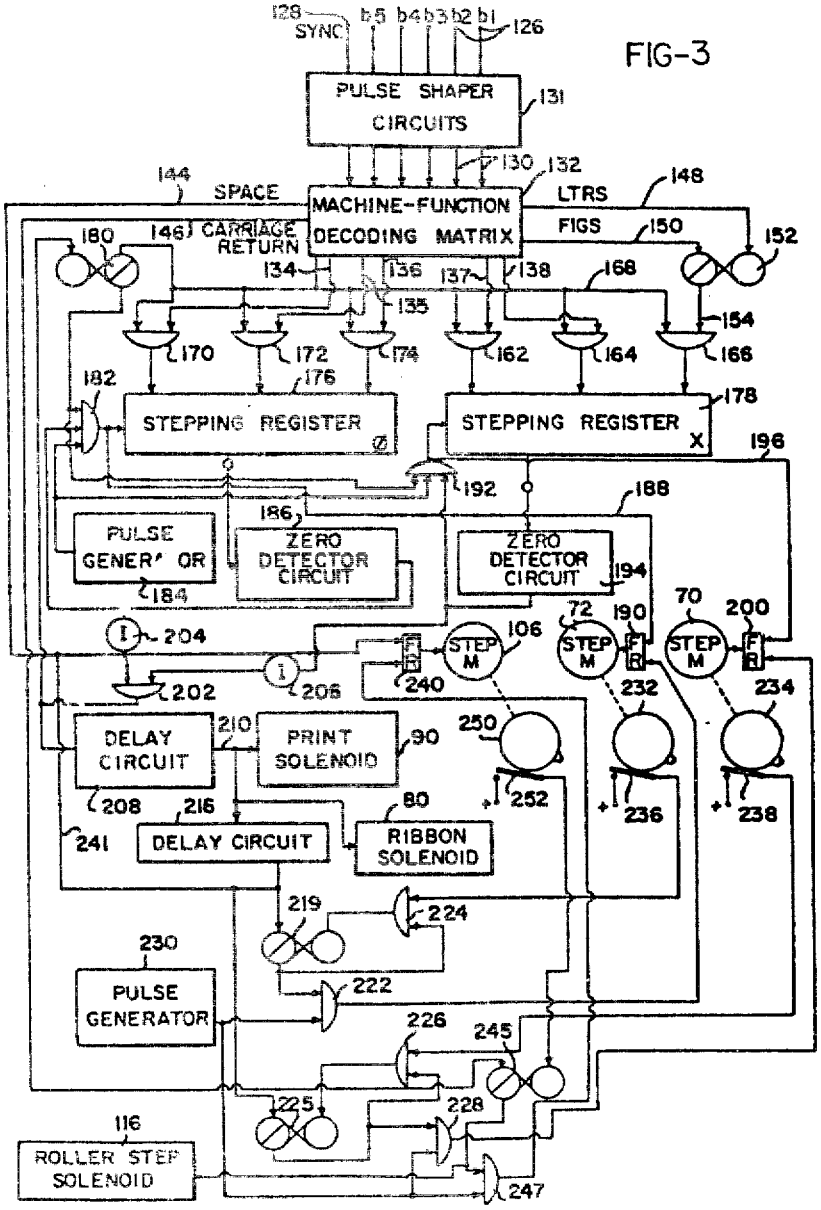
FIG. 3 is a diagrammatic representation of the electrical system employed in the printer of FIG. 1.

At the top of FIG. 3 are a set of terminals 126 labelled $b_1$ through $b_5$ and separately provided to receive the five parallel bits of a Baudot telegraphic code. That is, parallel pulse-no pulse (binary) code signals are separately applied to the terminals 126 to manifest various commands and symbols. A synchronizing signal, or clock pulse, for the parallel code is applied to a terminal 128 to manifest the time interval during which a set of code signals are manifest.

Of course, a wide variety of code signals may be employed in accordance with the present invention, for example, both parallel and serial signals may be employed and virtually any form of representation or format may be utilized so long as a separate code is provided for each symbol or command to be identified.

The pulses received at the terminals 126 are applied to pulse shaper circuits 131 which may take the form of six separate trigger circuits or other networks to form discrete noise-free pulses in the parallel lines 130, coinciding to the input terminals. Thus, six lines 130 emerging from the pulse shaper circuits 131 carry signals $b_1$ through $b_6$ and "sync" which are applied to a machine-function decoding matrix 132.

Structurally, the decoding matrix 132 may comprise a plurality of diodes or other logic network elements to provide a translation of the input code signals to a form of coding applicable to the present system. Of course, various translating or decoding matrix techniques are well known in the prior switching art to accomplish this function, as for example is taught in the book "Arithmetic Operations in Digital Computers," by R. K. Richards, published 1955 by D. Van Nostrand Co.

Thus, the matrix 132 provides five outputs on conductors 134 through 142 through 138 which are coded to designate the various symbols desired to be printed. Furthermore the decoding matrix 132 also recognizes a particular input code to indicate: a "space"; a "carriage return"; and a designation for "the following code groups are letters" or "figures."

Upon recognizing a "space" command, the matrix provides a pulse output on a conductor 144. The occurrence of a "carriage return" command provides a high output from the decoding matrix 132 on a conductor 146; and depending upon whether a command indicates "letters" or "figures" are to follow, a high output appears in either of the conductors 148 or 150, respectively.

The conductors 148 and 150 are applied to the input terminals of a bistable multivibrator or flip-flop 152 which is represented by a somewhat-conventional symbol employed here throughout for that circuit. Essentially, the output of the flip-flop 152 provides another digit or binary signal $b_0$ along with those contained in the conductors 134 through 138 to result in a six-bit binary code word. Of course, the output from the flip-flop 152 to conductor 154 changes only after a command signal is given to the decoding matrix 132, instructing that "the following code signal or code signals shall be interpreted as letters" for example.

The six-bit code word emerging from the matrix 132 in the conductors 134 through 138 and from the flip-flop 152 in conductor 154 may follow the format set forth in the following Table 1. Note that the conductor 154 carries the most significant binary digit, conductors 137 and 138 next, and conductors 134, 135 and 136 carrying the least-significant digits.

TABLE 1

| Code Register 178:176 | Designation | X Displacement | ϕ Displacement |
|---|---|---|---|
| 000000 | Blank | 0 | 0 |
| 000001 | T | 0 | 1 |
| 000010 | (GR) | 0 | 2 |
| 000011 | O | 0 | 3 |
| 000100 | (SP) | 0 | 4 |
| 000101 | H | 0 | 5 |
| 000110 | N | 0 | 6 |
| 000111 | M | 0 | 7 |

TABLE 1-continued

| Code Register 178:176 | Designation | X Displacement | ϕ Displacement |
|---|---|---|---|
| 001000 | (LF) | 1 | 0 |
| 001001 | L | 1 | 1 |
| 001010 | R | 1 | 2 |
| 001011 | G | 1 | 3 |
| 001100 | I | 1 | 4 |
| 001101 | P | 1 | 5 |
| 001110 | C | 1 | 6 |
| 001111 | V | 1 | 7 |
| 010000 | E | 2 | 0 |
| 010001 | Z | 2 | 1 |
| 010010 | D | 2 | 2 |
| 010011 | B | 2 | 3 |
| 010100 | S | 2 | 4 |
| 010101 | Y | 2 | 5 |
| 010110 | F | 2 | 6 |
| 010111 | X | 2 | 7 |
| 011000 | A | 3 | 0 |
| 011001 | W | 3 | 1 |
| 011010 | J | 3 | 2 |
| 011011 | (FIGS) | 3 | 3 |
| 011100 | U | 3 | 4 |
| 011101 | Q | 3 | 5 |
| 011110 | K | 3 | 6 |
| 011111 | (LTRS) | 3 | 7 |
| 100000 | (BL) | 4 | 0 |
| 100001 | 5 | 4 | 1 |
| 100010 | (CR) | 4 | 2 |
| 100011 | 9 | 4 | 3 |
| 100100 | (SP) | 4 | 4 |
| 100101 | (STOP) | 4 | 5 |
| 100110 | , | 4 | 6 |
| 100111 | . | 4 | 7 |
| 101000 | (LF) | 5 | 0 |
| 101001 | ) | 5 | 1 |
| 101010 | 4 | 5 | 2 |
| 101011 | & | 5 | 3 |
| 101100 | 8 | 5 | 4 |
| 101101 | ϕ | 5 | 5 |
| 101110 | : | 5 | 6 |
| 101111 | ; | 5 | 7 |
| 110000 | 3 | 6 | 0 |
| 110001 | " | 6 | 1 |
| 110010 | $ | 6 | 2 |
| 110011 | ? | 6 | 3 |
| 110100 | (Bell) | 6 | 4 |
| 110101 | 6 | 6 | 5 |
| 110110 | ! | 6 | 6 |
| 110111 | / | 6 | 7 |
| 111000 | - | 7 | D |
| 111001 | 2 | 7 | 1 |
| 111010 | ' | 7 | 2 |
| 111011 | (FIGS) | 7 | 3 |
| 111100 | 7 | 7 | 4 |
| 111101 | 1 | 7 | 5 |
| 111110 | ( | 7 | 6 |
| 111111 | (LTRS) | 7 | 7 |

Thus, according to the above table, three digits of the code word are applied from the conductors 137, 138 and 154 to "and" gates 162, 164, and 166, respectively each of which also receives a signal from a conductor 168 manifesting the synchronizing pulse. The "and" gates may take the form of any of a variety of coincidence circuits which pass the high state of a two-state signal upon simultaneously receiving all input signals in a high state. These gates are represented in FIG. 3 by a symbol somewhat conventional in the art which is employed here throughout to manifest a coincidence or "and" gate.

A similar set of "and" gates 170, 172 and 174 receive inputs from the conductors 134, 135, and 136 respectively carrying the less-significant digits of the code words set forth above, and are also qualified by the synchronizing signals appearing in the conductor 168. The digital signals passing through the gates 170, 172 and 174 are registered in a stepping register 176 while the similar signals passing through the gate circuits 162, 164 and 166 are registered in a similar register 178. Thus, the stepping register 176 contains the three least-significant digits of the codes set forth in the above chart while the register 178 contains the three most-significant digits. Thus, the three digits in each of the registers serve to control in one case the rotational displacement from a home position of the type font 22 as shown in FIG. 1, and second the displacement of the font 22 parallel its axis. Specifically, the contents of the stepping register 176 serve to control the rotational or angular displacement of the font while the contents of the stepping register 178 serve to control the linear displacement of the font along its axis, both in accordance with the table set forth above.

The stepping registers 176 and 178 may comprise a variety of binary digital stepping registers which include three binary stages and are thus capable of accomplishing three binary digits to represent values up to "eight." For example, the registers 176 and 178 may be constructed in accordance with well known prior art principles using magnetic core elements or various other two-state devices interconnected in a step-register configuration.

The operation of a system as disclosed may now be best further considered by assuming the existence of certain numerical values in the registers 176 and 178, and proceeding with the introduction of other elements concurrently with the description of their function as the explanation proceeds. Therefore, assume initially that the flip-flop 152 provides a low level of a two-state signal through the conductor 154 to the gate 166, and therefore the stepping register 178 registers a "zero" as the most significant digit, along with a "one" as the next most significant digit, followed by a "zero." Further assume that the register 176 contains the binary digits "100" from the most significant to least significant. As indicated in the table above, this composite code "010", "100," designates the symbol S and requires a rotational displacement of four positions along with a transverse displacement of two positions. Therefore, in accordance with the table, the stepping register 176 contains a binary equivalent "four" while the stepping register 178 registers "two."

With the registers 176 and 178 in the configuration described, assume a flip-flop 180 (upper right in FIG. 3) is in a set state as a result of receiving the synchronizing signal from the conductor 168. Therefore, the high output from the flip-flop 168 qualifies an "and" gate 182 permitting pulses of regular interval from a pulse generator 184 to pass through the "and" gate 182 to the stepping register 176. The gate circuit 182, in addition to receiving pulses from the generator 184 and qualification by the flip-flop 180, receives a signal from a zero detector circuit 186 which functions to detect the clear state of the stepping register 176.

The zero detector circuit 186 may take a variety of forms, one of which is simply a well known "or" gate connected to receive a "one" output from each of the stages of the stepping register to provide a high output if any of the stages contain a "one."

The stepping register 176 receives clearing pulses through the gate 182 which remains qualified as long as the register 176 contains a value above "zero." The pulses applied to the stepping register 176 are also applied through a conductor 188 to a control circuit 190 functioning in conjunction with a stepping motor 72 as described in FIG. 2. As a result, the identical number of pulses required to clear the stepping register 176, is applied to the stepping motor 72 advancing that motor by a number of angular increments coinciding to the number of pulses received. The control circuit 190 may take various forms, well known in the prior art, as manufactured with the stepping motor 72 described above. In function, the control circuit has two distinct inputs; in input F to result in forward motion by the stepping motor and an input R that results in reverse motion by the step motor.

Control of the stepping motor 68 to move the type font along its axis (as described in FIG. 2) is accomplished in a somewhat similar fashion during the reset operation of the stepping register 178. The stepping register 178 receives pulses from the pulse generator 184 through an "and" gate 192 which is qualified by the flip-flop 180, and a zero-detector circuit 194 similar to circuit 186, as previously described. The zero-detector circuit 194 provides an output as long as the stepping register 178 contains any binary "ones"; however, when the register is clear, the zero detector circuit 194 provides the low value of a two-state signal, thereby disqualifying the gate 192. The pulses passed by the "and" gate 192 from the pulse generator 184 to clear the stepping register are also applied through a conductor 196 to the input F of the control circuit 200 functioning in conjunction with the step motor 68.

Reconsidering the assumed value "010" in the stepping register 178 and the value "100" in the stepping register 176, and further assuming the set state of the multivibrator 180 to provide a high output signal therefrom, the sequence of events which follow will now be described. The operation of the two stepping registers to set the associated stepping motors occurs simultaneously; however, consider first the operation of the stepping register 176 to rotationally displace the type font by energizing the stepping motor 72. Because the stepping register 176 contains a binary value "100" (number other than zero) a high signal passes from the zero detector circuit 186, which along with the high output from the flip-flop 180 qualifies the "and" gate 182 so that pulses from the pulse generator 184 pass to the stepping register 176 and to the input F of the control circuit 190 to advance the stepping motor 72.

The binary value "100" is the equivalent of decimal "four," therefore, four pulses are required to clear the stepping register 176. The same pulses employed to clear the stepping register are applied through the conductor 188 to advance the stepping motor 72 by four positions in accordance with the table set forth above to accomplish the desired rotational displacement of the type font to locate the symbol S.

In a somewhat similar fashion the zero detector circuit 194 and the multivibrator 180 qualify the "and" gate 192 to permit the passage of pulses frm the generator 184 to the stepping register 178. The stepping register 178 contains a binary digital value "100," equivalent decimal two; therefore, two pulses are required to be applied to the stepping register before it is reset. Of course, upon being reset, the stepping register 178 is detected to contain "zero" by the circuit 194 thereby immediately disqualifies the gate 192. The two pulses to reset the stepping register 178 are also applied through the input F of the control circuit 200 to advance the stepping motor 70 two positions and accomplish the desired linear displacement of the type font 22 to provide the symbol S in a position to print.

At this stage of operation, the desired symbol S is in a position to be printed and the zero detector circuits 186 and 194 both provide low outputs indicating both the registers 176 and 178 have been cleared. This condition is sensed by an "and" gate 202 which is connected to receive one input through an inverter circuit 204 from the zero detector circuit 186 and another input through an inverter circuit 206 from the zero detector circuit 194. Thus, the "and" gate 202 receiving inverted forms of the signals provides a high output of a two-state signal when both the stepping registers 176 and 178 are cleared. The high output from the gate circuit 202 resets the multivibrator 180 and pulses a delay circuit 208, which after a predetermined delay interval provides a pulse in a conductor 210. The conductor 210 is connected to the print solenoid 90, the ribbon solenoid 80, and a delay circuit 216. The pulse from the delay circuit 208 applied to the print solenoid 90 and the ribbon solenoid 80 activates the hammer as previously described and the ribbon, to accomplish the selected symbol as a printed letter on the paper.

The pulse from the delay circuit 208 applied through the delay circuit 216 serves to set a flip-flop 219 providing a high output to "and" gates 222 and 224. The pulse employed to set the flip-flop 219 also serves to set a flip-flop 225 which provides a high output to "and" gates 226 and 228. This portion of the system serves to reset the stepping motors 68 and 72 to return the type font to "home" position, i.e. the zero or dwell position.

The gate circuits 222 and 228 upon qualification by the flip-flops 219 and 225 respectively pass pulses from a pulse generator 230 to the control circuits 190 and 200 respectively. These pulses are applied to the input R of the control circuits driving the stepping motors 72 and 70 in the reverse direction. These stepping motors are mechanically coupled (as indicated in FIG. 3) to home-position disks 232 and 234 respectively which upon reaching the "home" position close switches 236 and 238 respectively. Operation is similar; however, upon the closure of the switch 236 for example, a positive signal is applied through the gate circuit 224 to reset the flip-flop 119 stopping further pulses from being applied to the stepping motor 72 by disqualifying the gate 222. In a similar fashion, the disk 234 upon reaching the "home" position closes the switch 238 to apply a positive signal through the gate 226 to reset the flip-flop 225 thereby inhibiting the gate 228. Thus, the stepping motors 68 and 72 are returned to the home position preparatory to another operation of positioning a desired symbol in a printing position.

Along with resetting the type font to the "home" position, it is necessary to advance the hammer and the font to the next position to be printed upon. This operation is accomplished by a pulse from the delay circuits 216 which is applied through a conductor 241 to the input F of a control circuit 240 which functions in conjunction with the stepping motor 106. The single applied pulse advances the stepping motor 106 one position preparatory to printing the next symbol. Of course, the next position may be established as a space rather than a symbol, which occurrence is manifest by a pulse in the conductor 144 from the decoding matrix 132. The pulse appearing in the conductor 144 is applied to the control circuit 240 at the F input just as previously described to step the hammer 20 and the type font one more position to the right, leaving a blank space.

In this manner, the system functions to accomplish a complete line of type, after which it is necessary to return the printing elements to the starting position of a new line of type and advance the paper horizontally one line. The carriage return pulse sensed and formed from the decoding matrix 132 upon receiving such a command, is applied through a conductor 146 to a flip-flop 245 resulting in a high signal from the flip-flop which energizes the roller step solenoid 116 to advance the paper as previously described. The flip-flop 245 also qualifies an "and" gate 247 permitting pulses from the generator 230 to pass to the reset input R of the control circuit 240 thereby reverse stepping the stepping motor 106 until the associated disk 250 manifests the home position by closing a switch 252 which results in the application of a positive signal to reset the flip-flop 245. Upon resetting the flip-flop 245, the gate 247 is disqualified; however, the printing elements have now been returned to the starting position for another line.

It may therefore be seen, that the system of the present invention may be embodied in a compact unit wherein reliable stepping motors accomplish a simplified mechanical structure for reliable operation in mobile installations. Another important feature of the present invention resides in the use of stepping registers in conjunction with the stepping motors to control the stepping motors.

Although various features and concepts of the present invention have been set forth in the foregoing illustrative embodiment, the present invention is not to be limited in accordance therewith but is to be constructed in accordance with the claims set forth below.

What is claimed is:

[1. A printer for executing various symbols on command, comprising:

a type element with plural symbols carried thereon;

mounting means for said type element, whereby said element may be variously displaced to present said symbols thereon in a printing position;

means for providing a series of electrical pulses indicative of a desired displacement of said type element to accomplish a predetermined symbol;

at least one bidirectional stepping motor having a home position and connected to receive said pulses for displacing said type element in accordance with said electrical pulses;

means for activating said type element to print; and means for returning said stepping motor for said home position after said type element is activated, by applying pulses to said stepping motor.]

2. A printer for a plurality of characters, comprising:

a type body having lines defining said characters about the surface thereof;

means for supporting said type body whereby said type body may be variously displaced in plural directions from a quiescent position whereby to present said characters in a printing position;

means for providing plural sets of electrical pulses, each of said sets being indicative of a displacement in one direction to accomplish a desired position for a predetermined character;

a plurality of bidirectional stepping motors, each connected to receive one of said sets of electrical pulses and being mechanically coupled to said type body whereby to displace said type body in one direction;

means for activating said type body to print; and means for providing return pulses to said stepping motors after said type body is activated to print.

3. A printer for printing any of a plurality of characters in sequence on a printing medium, comprising:

a type body having lines defining said characters about the surface thereof;

support means for supporting said printing medium contiguous said type body;

mounting means for said type body whereby said body may be variously displaced to move each of said characters along at least two paths to position a select character in printing relationship to said medium;

means for providing at least two sets of electrical pulses, each indicative of a predetermined displacement of a select character along one of said paths to position said select character for printing;

at least two bidirectional stepping motors, each connected to receive one of said sets of electrical pulses, said stepping motors being connected to said type body whereby to displace each of said characters along one of said paths in accordance with said sets of electrical pulses; and means to activate said type body relative said printing medium, whereby to print.

4. A printer for printing any of a plurality of characters in sequence on a printing medium, in accordance with electrical code signals indicative of characters comprising:

a type body having lines defining said characters about the surface thereof;

support means for supporting said printing medium contiguous said type body;

mounting means for said type body whereby said body may be variously displaced to move each of said characters along at least two directional paths to position a select character in printing relationship to said medium;

plural shift registers for receiving components of said electrical code signals indicative of characters;

means for pulsing said shift registers to provide sets of pulses, each indicative of a displacement in one direction to accomplish a desired position for a predetermined character;

a plurality of bidirectional stepping motors, each connected to receive one of said sets of electrical pulses and being mechanically coupled to said type body whereby to each displace said type body in one of said directions; and means to activate said type body relative said printing medium, whereby to print.

5. A printer according to claim 4, wherein said type body is generally cylindrical and said mounting means enables displacement along and about the central axis of said generally-cylindrical type body, 6. A printer according to claim 5 wherein said means to activate said type body comprises a hammer means to drive said printing medium against said type body to impress a character on said medium.

7. A printer for printing any of a plurality of characters in sequence on a printing medium, in accordance with electrical code signals indicative of characters, comprising:

a type body having lines defining said characters about the surface thereof;

means for supporting said printing medium contiguous said type body;

mounting means for said type body whereby said body may be variously displaced to move each of said characters in two directions along at least two paths to position a select character in printing relationship to said medium;

plural shift registers for receiving components of said electrical code signals indicative of characters;

means for pulsing said shift registers to provide sets of pulses, each indicative of a displacement in one direction to accomplish a desired position for a predetermined character;

a plurality of bidirectional stepping motors, each connected to receive one of said sets of electrical pulses and being mechanically coupled to said type body whereby to displace said type body in one direction;

means to activate said type body relative said printing medium, whereby to print;

shift means to shift said type body relative said printing medium upon each printing operation whereby to provide a fresh section of said medium for said type body; and means to supply return pulses to said stepping motors to displace said type body in the other directions to a reset position.

8. A printer according to claim 7 wherein said stepping motors include means to signal a home position thereof and wherein said system includes means for providing return step pulses to said stepping motors after each printing operation, terminated by said means to signal a home position.

9. A printer according to claim 7 wherein said shift registers are connected to register component parts of said electrical code signals and wherein said system further includes means to provide pulses to form said sets of pulses, and to clear said code signals for said shift registers whereby to define said sets of pulses.

* * * * *

UNITED STATES PATENT AND TRADEMARK OFFICE

CERTIFICATE OF CORRECTION

PATENT NO. : Re 30,942

DATED : May 25, 1982

INVENTOR(S) : Takenaka , George

It is certified that error appears in the above–identified patent and that said Letters Patent are hereby corrected as shown below:

Col. 12, line 50, change "for" to -- from --.

Signed and Sealed this

Tenth Day of August 1982

[SEAL]

Attest:

GERALD J. MOSSINGHOFF

Attesting Officer

Commissioner of Patents and Trademarks